(12) United States Patent
Lefers et al.

(10) Patent No.: US 11,659,796 B2
(45) Date of Patent: May 30, 2023

(54) MODULAR, INSULATED, PLUG-AND-PLAY AQUAPONICS UNIT AND METHOD

(71) Applicant: KING ABDULLAH UNIVERSITY OF SCIENCE AND TECHNOLOGY, Thuwal (SA)

(72) Inventors: Ryan Lefers, Thuwal (SA); Mahmoud Abdul-Jawad, Jeddah (SA); Aftab Alam, Frisco, TX (US); Haitham Anbar, Jeddah (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 100 days.

(21) Appl. No.: 16/954,038

(22) PCT Filed: Jan. 3, 2018

(86) PCT No.: PCT/IB2018/050042
§ 371 (c)(1),
(2) Date: Jun. 15, 2020

(87) PCT Pub. No.: WO2019/135104
PCT Pub. Date: Jul. 11, 2019

(65) Prior Publication Data
US 2020/0344966 A1 Nov. 5, 2020

(51) Int. Cl.
*A01K 63/10* (2017.01)
*A01K 63/04* (2006.01)
(Continued)

(52) U.S. Cl.
CPC ............ *A01G 31/06* (2013.01); *A01K 63/042* (2013.01); *A01K 63/045* (2013.01);
(Continued)

(58) Field of Classification Search
CPC .. A01K 63/047; A01K 63/045; A01K 63/042; A01K 63/10; A01K 63/003;
(Continued)

(56) References Cited

U.S. PATENT DOCUMENTS 4,892,651 A * 1/1990 Hill ...................... A01K 63/045
119/227
5,046,451 A 9/1991 Inslee et al.
(Continued)

FOREIGN PATENT DOCUMENTS

CN 202524909 U * 11/2012 ............. A01K 63/04
CN 202524909 U 11/2012
(Continued)

OTHER PUBLICATIONS

Cityblooms (https://cityblooms.com/), downloaded from the internet Jun. 15, 2020.
(Continued)

*Primary Examiner* — Peter M Poon
*Assistant Examiner* — Carly W. Lynch
(74) *Attorney, Agent, or Firm* — Patent Portfolio Builders PLLC

(57) ABSTRACT

There is a modular, insulated, all-in-one, plug-and-play (MIAP) aquaponics unit that includes a framework having a single base and plural walls; an aquaculture tank defined by a first portion of the single base and a first set of the plural walls; a clarifier tank defined by a second portion of the single base and a second set of the plural walls; a bio-reactor tank defined by a third portion of the single base and a third set of the plural walls; a hydroponics tank defined by a fourth portion of the single base and a fourth set of the plural walls; and piping extending through the plural walls between each two adjacent tanks for allowing water from the aquaculture tank to flow into the clarifier tank and then into (Continued)

the bio-reactor tank and then into the hydroponics tank and back to the aquaculture tank.

15 Claims, 15 Drawing Sheets

(51) Int. Cl.
    *A01G 31/00*     (2018.01)
    *A01K 63/06*     (2006.01)
    *A01G 31/06*     (2006.01)
    *A01G 7/04*     (2006.01)

(52) U.S. Cl.
    CPC ............ *A01K 63/047* (2013.01); *A01K 63/10* (2017.01); *A01G 7/045* (2013.01); *A01G 2031/006* (2013.01); *A01K 63/065* (2013.01)

(58) Field of Classification Search
    CPC ................ A01K 63/006; A01G 31/06; A01G 2031/006; B65D 81/3825; B65D 81/3827
    See application file for complete search history.

(56) References Cited

U.S. PATENT DOCUMENTS

| | | | | |
|---|---|---|---|---|
| 5,056,260 | A | | 10/1991 | Sutton |
| 5,891,711 | A | * | 4/1999 | Carter .................... B01D 53/85 |
| | | | | 435/299.1 |
| 6,065,430 | A | * | 5/2000 | Sheriff ................. A01K 63/042 |
| | | | | 119/227 |
| 9,374,986 | B2 | * | 6/2016 | Sheriff ................. A01K 63/042 |
| 2004/0074834 | A1 | * | 4/2004 | Beckman ............. A01K 63/045 |
| | | | | 210/323.1 |
| 2014/0251932 | A1 | * | 9/2014 | Lutz ....................... A01K 63/06 |
| | | | | 211/85.26 |
| 2015/0173304 | A1 | * | 6/2015 | Davis ................... A01K 63/042 |
| | | | | 119/246 |
| 2019/0124862 | A1 | * | 5/2019 | Mays ....................... A01G 9/26 |
| 2019/0343091 | A1 | * | 11/2019 | Weiner ................. A01K 63/047 |

FOREIGN PATENT DOCUMENTS

| | | | | | |
|---|---|---|---|---|---|
| CN | 104488686 | A | | 4/2015 | |
| CN | 106719279 | A | * | 5/2017 | ........... A01K 63/042 |
| CN | 106852291 | A | * | 6/2017 | ........... A01K 63/042 |
| KR | 101062017 | B1 | * | 9/2011 | ............. A01G 31/00 |
| KR | 101799761 | B1 | * | 11/2017 | ........... A01K 63/045 |
| TW | M483667 | U | | 8/2014 | |
| WO | WO-2007100467 | A2 | * | 9/2007 | ........... A01K 63/047 |

OTHER PUBLICATIONS

Farm From a Box System (https://www.farmfromabox.com/), downloaded from the internet Jun. 15, 2020.

International Search Report in corresponding/related International Application No. PCT/IB2018/050042, dated Oct. 19, 2018.

Nelson and Pade F-5 System (https://aquaponics.com/shop/fantastically-fun-fresh-food-factory/), downloaded from the internet Jun. 15, 2020.

Written Opinion of the International Searching Authority in corresponding/related International Application No. PCT/B2018/050042, dated Oct. 19, 2018.

* cited by examiner

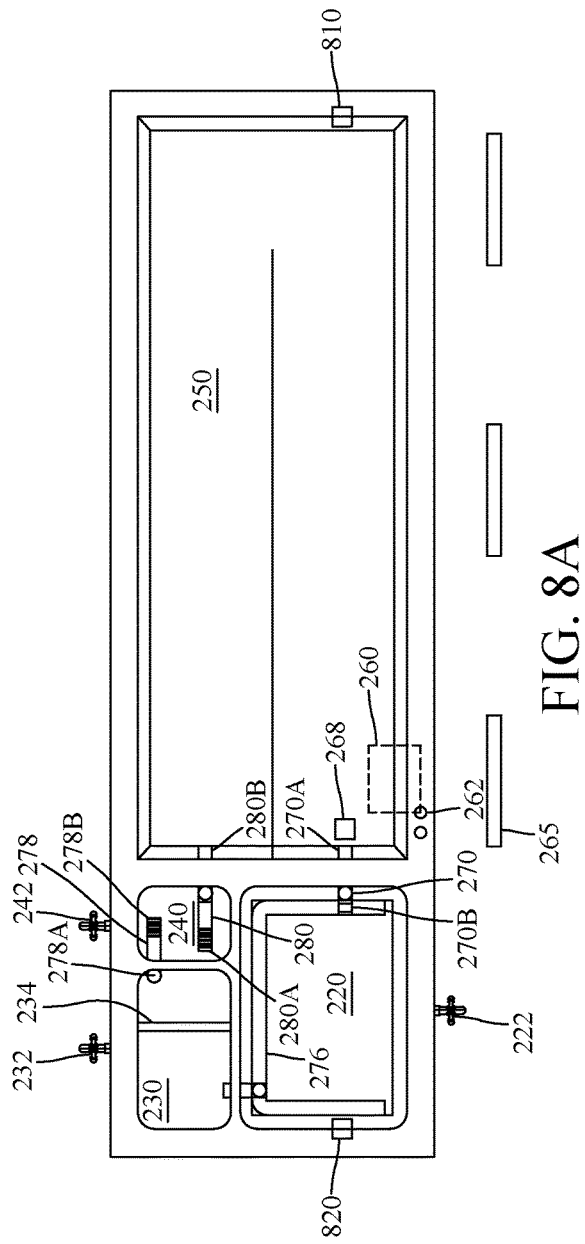
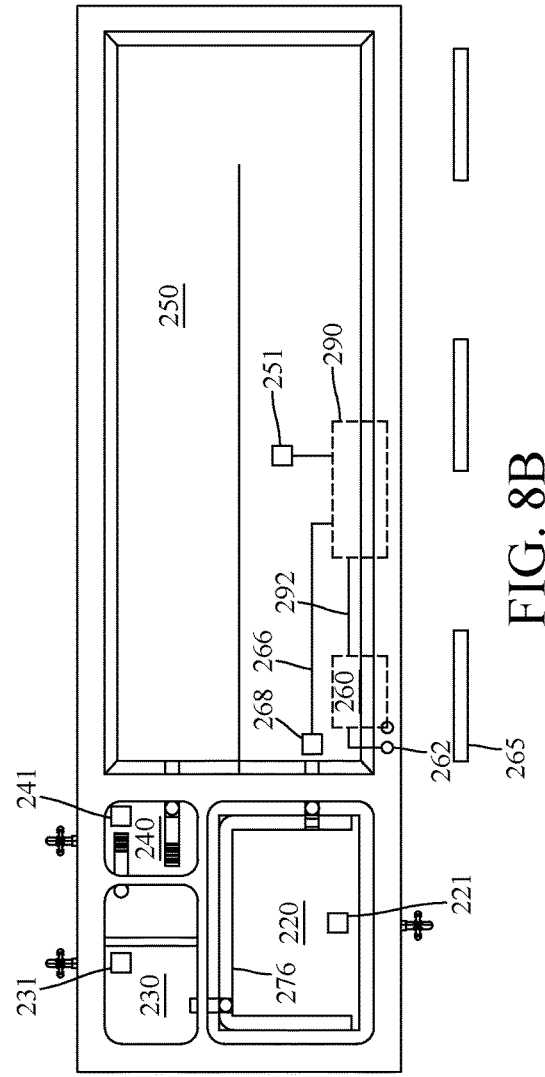
FIG. 8A
FIG. 8B

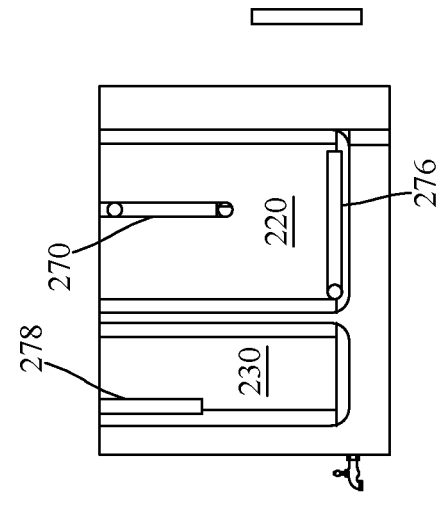
FIG. 9A
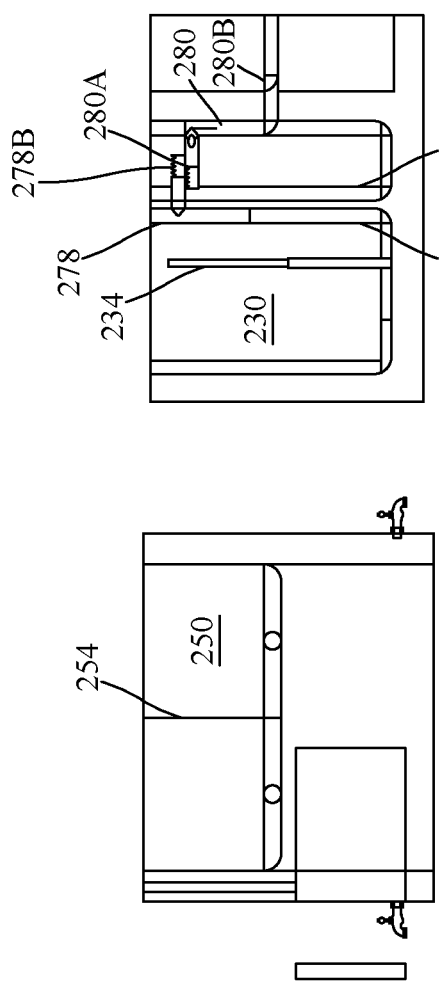
FIG. 9B
FIG. 9C
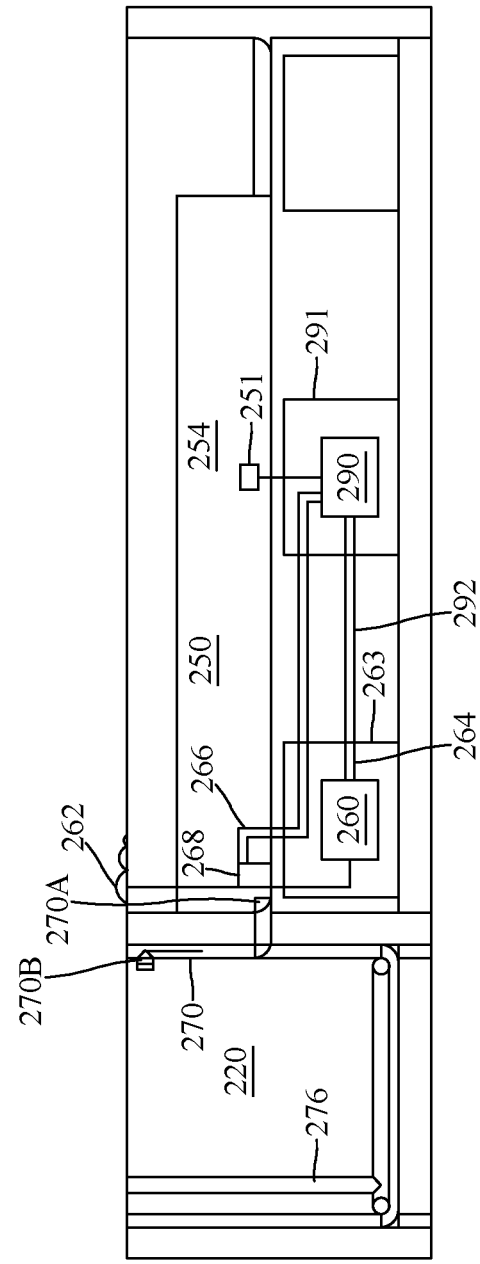
FIG. 9D

MODULAR, INSULATED, PLUG-AND-PLAY AQUAPONICS UNIT AND METHOD

CROSS-REFERENCE TO RELATED APPLICATIONS

This application claims priority to International Application No. PCT/IB2018/050024, filed on Jan. 3, 2018, the disclosure of which is incorporated herein by reference in its entirety.

BACKGROUND

Technical Field

Embodiments of the subject matter disclosed herein generally relate to aquaponics systems, and more specifically, to a self-contained aquaponics unit that is ready to be used out of the packaging material.

Discussion of the Background

The term aquaponics means the combination of aquaculture (raising fish) and hydroponics (the soil-less growing of plants). Thus, an aquaponics unit is a system that grows fish and plants together. The fish waste provides an organic food source for the plants, and the plants naturally filter the water for the fish.

Aquaponics relies on the recycling of nutrient-rich water from one part of the system to another part. In aquaponics there is no toxic run-off from either hydroponics or aquaculture. The aquaponics systems use less water than soil-based gardening, and even less water than hydroponics or recirculating aquaculture. The aquaponics systems can be placed wherever they are required, inside or outside.

One advantage of the aquaponics system is that instead of using chemicals to grow plants, aquaponics uses highly nutritious fish effluent that contains most of the required nutrients for optimum plant growth. Further, instead of discharging the water from the aquaculture system, aquaponics uses the plants and the media in which they grow in to clean and purify the water, after which it is returned to the aquaculture tank. Often times, this water can be reused indefinitely and will only need to be topped-off when it is lost through transpiration from the plants and evaporation.

However, a problem with the existing aquaponics systems is that each component of the system is a separate, stand-alone piece, as illustrated in FIG. 1. FIG. 1 shows an aquaponics system in its simplest form 100 that includes an aquaculture system 110, a hydroponics component 120, and a pump 130. Various piping parts 140 connect these elements together. The pump 130 is also connected to a power source and ensures that water from the aquaculture tank flows to the plant tray and water from the plant tray flows to the aquaculture tank. Because all these components are stand-alone, the buyer of the system needs to put them together and connect all the existing piping to the various components. This process requires effort and time as each component must be installed and connected properly at the site. Improper plumbing and setup as a result of novice assembly can also lead to system inefficiencies and improper flow patterns. In addition, the current systems are not easy to scale-up or connect to other units. Note also that the components are typically not insulated, allowing for significant heat gain/loss and the potential to stress/kill both fish and plants in harsh climates.

Some similar agriculture systems currently on the market are now discussed. The "farm from a box" system (see "http://www.farmfromabox.com/") is large, non-movable, and relies more on soil-based agriculture. It also has a high price point (about $25,000), which is cost prohibitive for many audiences.

Cityblooms (see "http://cityblooms.com/") is a small scale, modular hydroponics system with built-in environmental control. Although small scale, this system is large enough to prevent adoption by the grow-at home, educational, and small modular market. The hydroponics tank and water storage still need to be assembled and connected to each other. In other words, the plant production system is still separate from the other components. Further, this system is for hydroponics, not aquaponics (i.e., it does not include fish production.)

Nelson and Pade F-5 System (see "https://aquaponics-.com/aquaponic-systems/f-5-fantastically-fun-fresh-food-factory/") is a small scale aquaponics production unit. The F-5 system must be assembled onsite, requiring plumbing skill, time, and manual labor. Further, the F-5 is not designed to be modular in nature, i.e., it is not designed for easy connection and scale up. The F-5 provides no insulation for system components, leading to a large amount of heat transfer to the surrounding environment and potential temperature swings that can be lethal to fish, microorganisms, and/or plants.

The above discussed systems have shortcomings and thus, there is a need for an aquaponics unit that overcome them.

SUMMARY

According to an embodiment, there is a modular, insulated, all-in-one, plug-and-play (MIAP) aquaponics unit. The unit includes a framework having a single base and plural walls, an aquaculture tank defined by a first portion of the single base and a first set of the plural walls, a clarifier tank defined by a second portion of the single base and a second set of the plural walls, a bio-reactor tank defined by a third portion of the single base and a third set of the plural walls, a hydroponics tank defined by a fourth portion of the single base and a fourth set of the plural walls, and piping extending through the plural walls between each two adjacent tanks for allowing water from the aquaculture tank to flow into the clarifier tank and then into the bio-reactor tank and then into the hydroponics tank and back to the aquaculture tank.

According to another embodiment, there is a modular, insulated, all-in-one, plug-and-play (MIAP) aquaponics unit that includes a framework having a single base and plural walls, an aquaculture tank and a hydroponics tank defined by the single base and the plural walls, piping formed in the plural walls between the aquaculture tank and the hydroponics tank, and an air pump that compresses air and pushes water from the hydroponics tank to the aquaculture tank through the piping. The framework is insulated, and the unit requires no assembly for being used.

According to still another embodiment, there is a method of manufacturing a modular, insulated, all-in-one, plug-and-play (MIAP) aquaponics unit, the method including providing a block of foam, manufacturing a framework from the block of foam, the framework having a single base and plural walls, constructing an aquaculture tank in the framework, constructing a hydroponics tank in the framework so that both the aquaculture tank and the hydroponics tank share the single base and the plural walls, inserting piping in the plural walls, between the aquaculture tank and the hydroponics tank, and attaching an air pump to the framework, the air pump compressing air and pushing water from the hydroponics tank to the aquaculture tank through the piping.

BRIEF DESCRIPTON OF THE DRAWINGS

The accompanying drawings, which are incorporated in and constitute a part of the specification, illustrate one or more embodiments and, together with the description, explain these embodiments. In the drawings:

FIGS. 8A and 8B show a top view of a MIAP aquaponics unit and possible dimensions;

FIGS. 9A to 9D show a side view of the MIAP aquaponics unit and possible dimensions;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a single, unitary, aquaponics system. However, the embodiments discussed herein are not limited to such system.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a modular, insulated, all-in-one, plug and play (MIAP) aquaponics unit that can be used in stand-alone or modular fashion is introduced. The MIAP unit is designed to provide both individual and full scale production for commercial or semi-commercial, domestic and educational purposes or for hobbyists and organic food enthusiasts. Production output includes vegetables, flowers, and/or berries and fish. The MIAP system is constructed using a foam framework (e.g., expanded polystyrene (EPS) foam), for low-cost, low-weight, and high insulation. Other materials may also be used for this framework.

Figure 1:
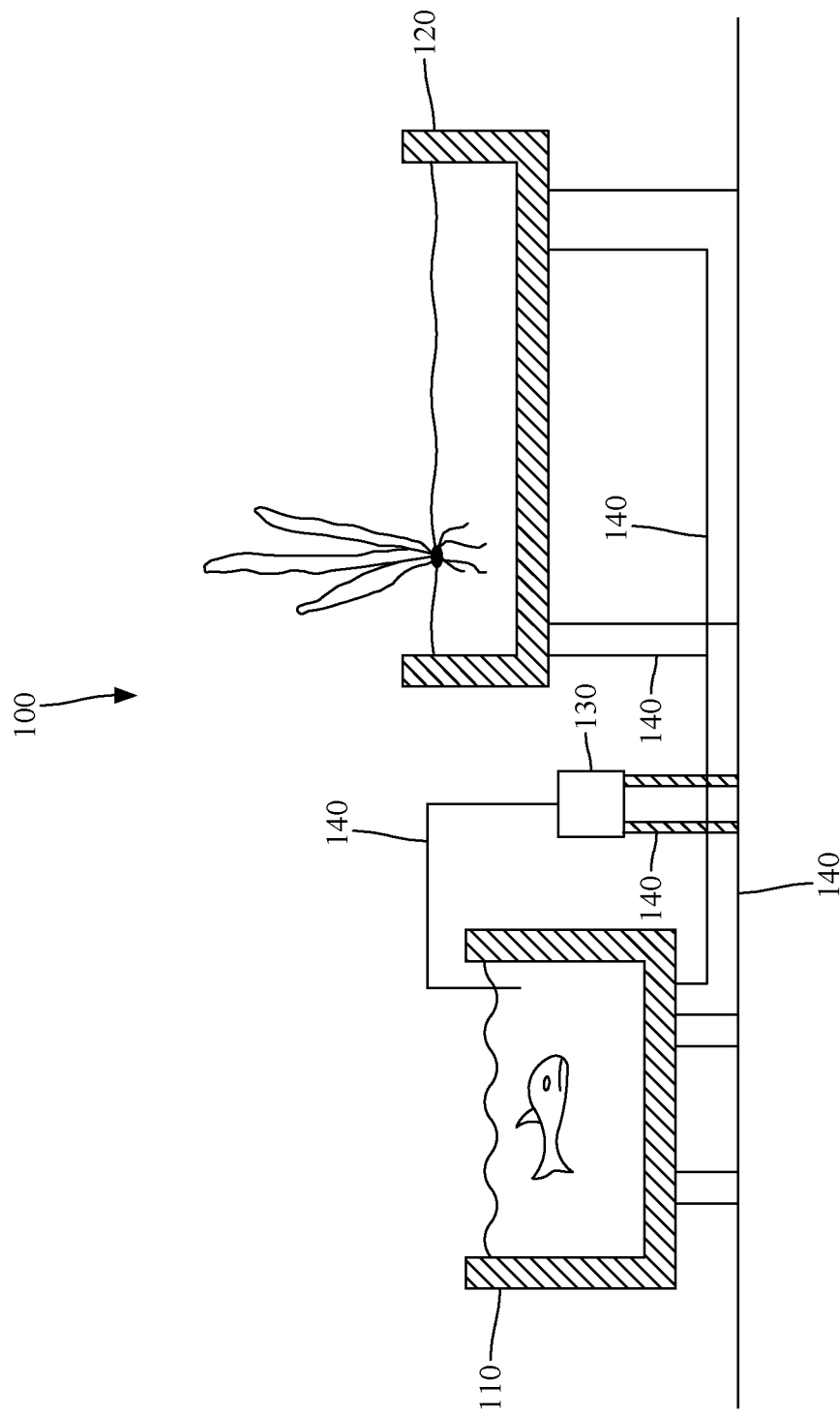
FIG. 1 illustrates a traditional aquaponics system having plural components that are connected to each other through various piping.
Figure 2:
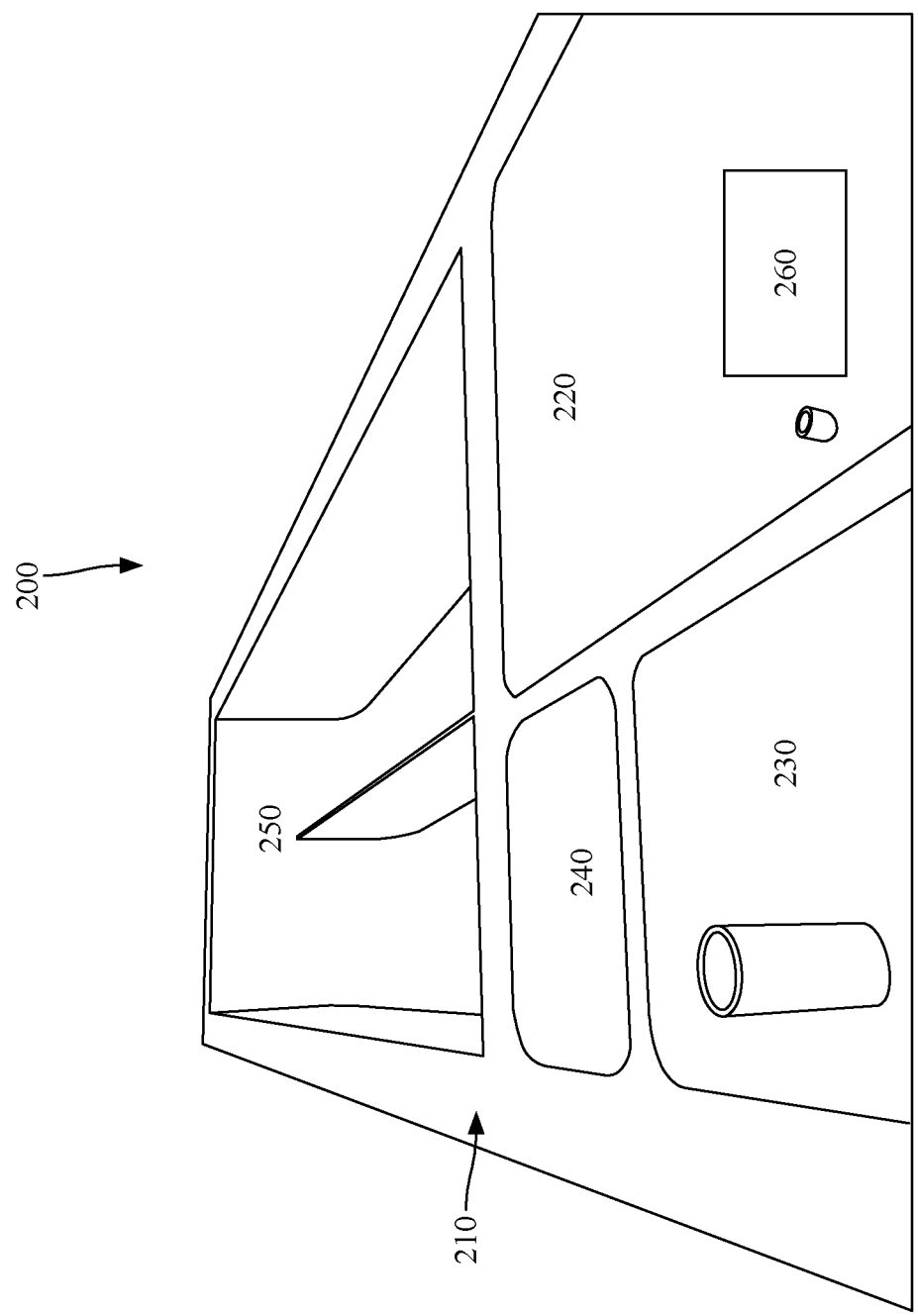
FIG. 2 illustrates a modular, insulated, all-in-one, plug and play (MIAP) aquaponics unit.

In one embodiment, as illustrated in FIG. 2, a MIAP unit 200 includes a foam framework (e.g., made of EPS) 210 that includes a aquaculture tank 220, a clarifier tank 230, a bio-reactor tank 240, and a hydroponics tank 250. All these elements 220, 230 240, and 250 are formed in the framework 210 in such a way that no element can be detached from the other elements (i.e., an unitary unit). In other words, contrary to the existing systems, the present MIAP unit 200 has all the components unitary formed within the framework 210. In one application, the framework 210 is a single block in which the various tanks are machined. In another application, the framework 210 is formed by plural walls 212 that are attached to a single base 214 to form the tanks noted above, as illustrated in FIG. 3. The walls 212 may be glued or attached by any known mean to the single base 214. An air pump 260 may be placed within the framework as discussed in the next paragraph. Note that the framework is built to be a single piece and thus, when sold, there is no need to arrange the various components in a certain order or to connect the components to each other with some piping. All the necessary piping is built in into the frame as discussed later. Thus, this integral unit is ready to be used as soon as the unit is placed at a desired location, filled with water and connected to an electrical outlet (for the air pump).

Figure 3:
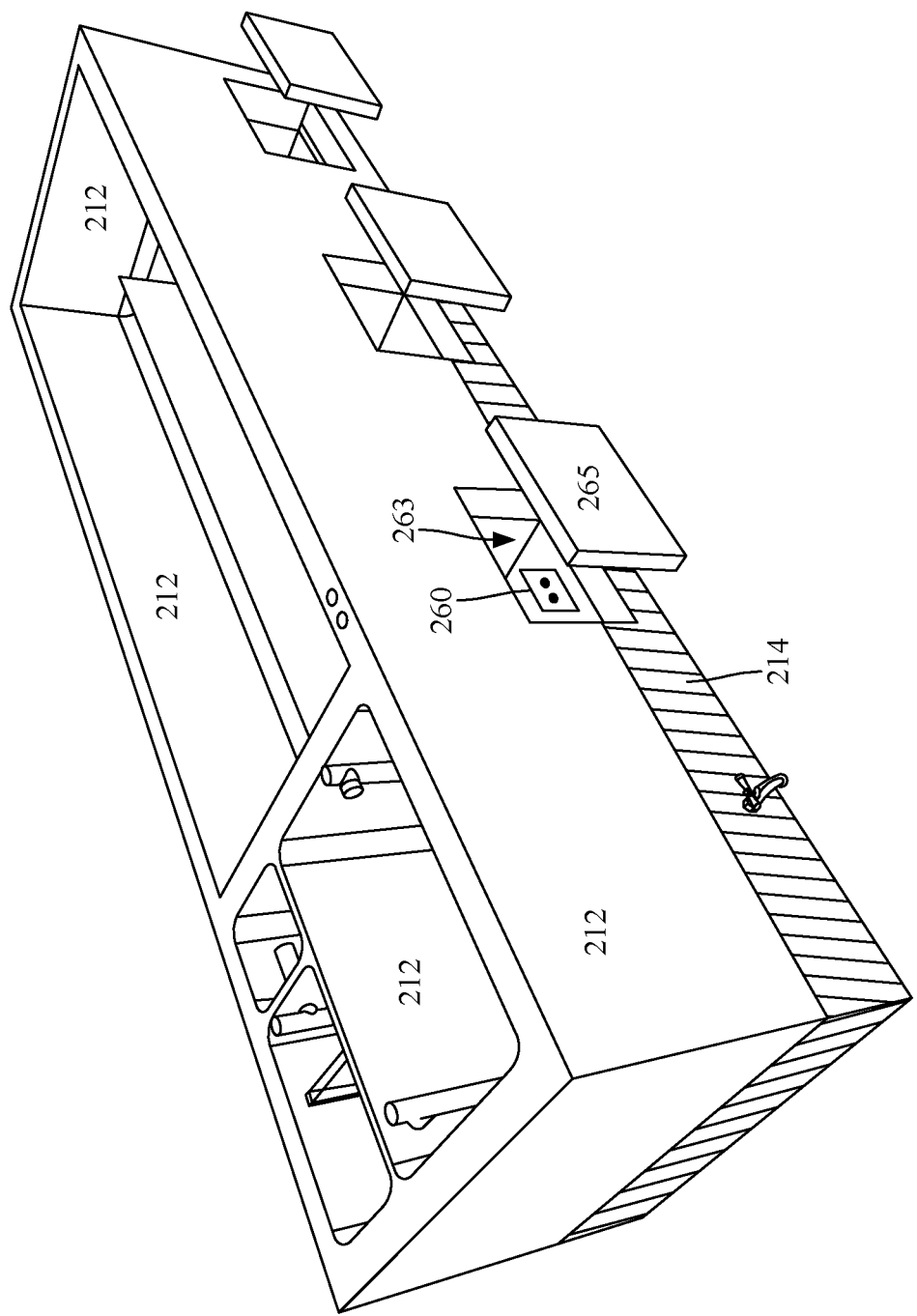
FIG. 3 illustrates a framework of the MIAP aquaponics unit.

Returning to FIG. 2, an air pump 260 is installed in the framework 210. In one application, as illustrated in FIG. 3, air pump 260 is placed in a chamber 263 formed in the walls of the unit. A lid 265 may be used to hide the pump from view. In another application, the air pump may be attached to a wall 212, e.g., inside of a tank or on an outside of the wall.

Figure 4:
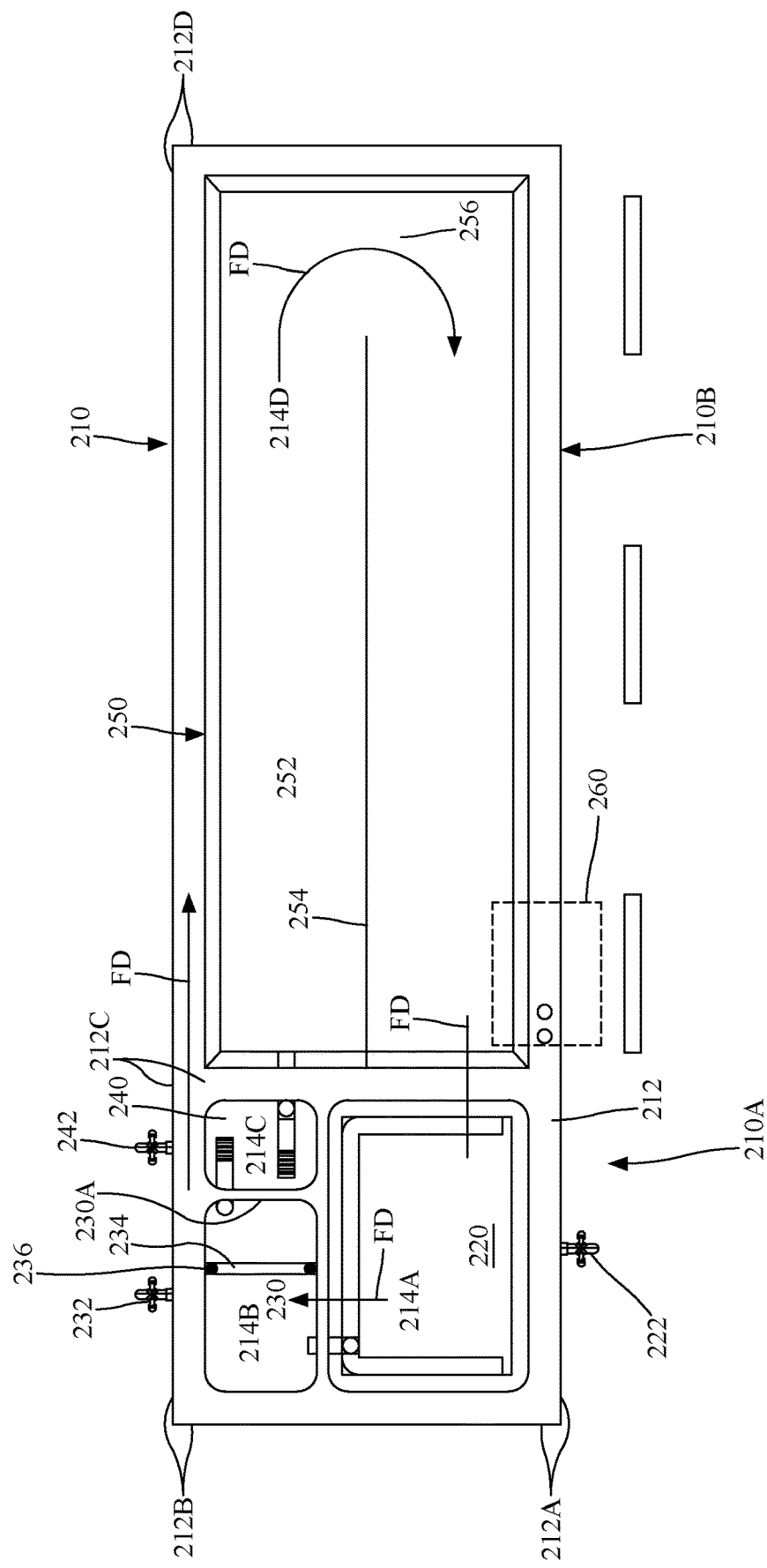
FIG. 4 is a top view of the MIAP aquaponics unit showing the various tanks that form the unit.

A top view of the MIAP unit 200 is shown in FIG. 4. In this embodiment, it can be seen that the aquaculture tank 220, clarifier tank 230 and bio-reactor tank 240 occupy a first region 210A of the framework 210 and the hydroponics tank 250 occupies a second region 210B of the framework 210. In one embodiment, the first region 210A is smaller than the second region 210B. In another embodiment, the first region is three times smaller than the second region. In still another embodiment, a width of the first region is the same as a width of the second region, but a length of the first region is about three times smaller than a length of the second region. In one embodiment, a length of the first region is about 90 cm, a width of the first region is about 100 cm, a length of the second region is about 3 m, and a width of the second region is about 100 cm. In this embodiment, the aquaculture tank may be 90×60 cm, the clarifier tank may be 35×60 cm and the bio-reactor may be 35×30 cm. One skilled in the art would understand that all these dimensions are exemplary and other dimensions (smaller or larger) may be used.

The aquaculture tank 220 in the MIAP unit 200 serves to culture the fish. The aquaculture tank may be 90 cm deep with 10 cm freeboard (water depth=80 cm) to hold a total of about 440 L (0.44 m$^3$) water volume for fish culture. The aquaculture tank may have a bottom side drain 222, included in the wall 212, to drain the aquaculture tank when/if needed.

The clarifier tank 230 in the MIAP unit 200 is used to filter large solid particles (uneaten fish feed and fish excreta) from the water. This tank may be 0.6 m long×0.35 m wide×0.90 m deep with a water level of 0.80 m (10 cm freeboard). The total volume of clarifier is about 0.165 m$^3$ and it may have a bottom side drain 232 for removing settled solids from the unit.

The clarifier tank 230 may have a cartridge filter 234 that, in one embodiment, may be a biological filter for removing various biological elements. In one application, the cartridge filter 234 is a low density matala filter media. The cartridge filter 234 may be located closer to at an outlet side 230A of the clarifier tank 230, between the clarifier tank 230 and the bio-reactor tank 240. The cartridge filter 234 may be sized to be 0.3 m long by 0.06 m wide and 0.90 m deep with a water level of 0.75 m. The cartridge filter 234 may be kept in place inside the clarifier tank 230 with a pair of rails 236 (see FIG. 6B for more details). Other mechanisms may be used for maintaining the cartridge filter 234 in place. The cartridge filter can be slide in and out if the pair of rails 236 is used.

The bio-reactor 240 in the MIAP unit 200 is located after the clarifier tank 230 and the cartridge filter 234 along a water flowing direction FD. The bio-reactor tank 240 may be, in one embodiment, 0.35 m long×0.28 m wide×0.9 m deep with a water level of 0.75 m and total design volume of 0.074 m$^3$. The bio-reactor may house 0.048 m$^3$ of biofilter media with the remainder of the space allocated for water. In one embodiment, the bio-reactor is a moving bed bio-reactor (MBBR) tank which includes moving units floating in the water. The moving units may be made out of glass or plastic. The sludge from the aquaculture tank grows on the internal surfaces of the moving units and the various bacteria present in the bio-reactor breaks down the organic matter from the waste water, supplying and converting nutrients into a form that is able to be utilized by the plants growing in the hydroponics component. In this way, the excess sludge may be removed, if necessary, through a bottom side drain 242 built into the framework 210.

The hydroponics tank 250 may be implemented as a hydroponic channel 252, as shown in FIG. 4. The hydroponic channel 252 is obtained, in one embodiment, by dividing the hydroponics tank 250 with a dividing wall 254. In this embodiment, the hydroponic channel 252 may be 2.8 m long×1 m wide×0.35 m deep with the dividing wall 254 opened at one end 256 to accelerate the water flow FD. The hydroponic channel 252 has, in this embodiment, a total of 2.8 m$^2$ plant growing surface area for growing crops. Note the much smaller depth of the hydroponics tank 250 relative to the depth of the aquaculture tank 220 (35 cm versus 90 cm). This difference in depth is made on purpose to achieve a volume of water that provides a desirable water retention time in both the plant and fish portions of the design, and to achieve natural water flow from the aquaculture components to the hydroponics tank (i.e., no pump is needed for the water to travel from the aquaculture tank to the hydroponics tank).

Figure 5:
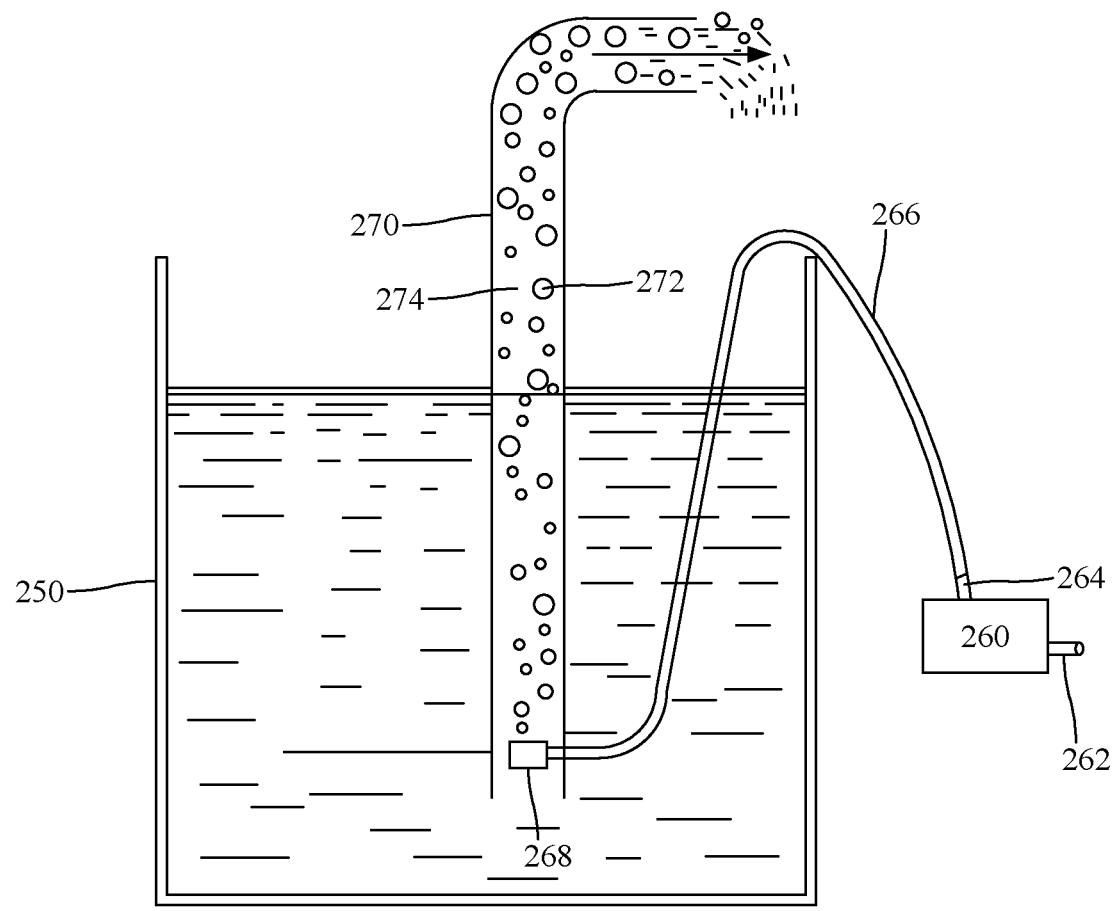
FIG. 5 illustrates an air lift pump, a type of water pumping system that depends upon the movement of air to force the movement of water.
Figure 6A:
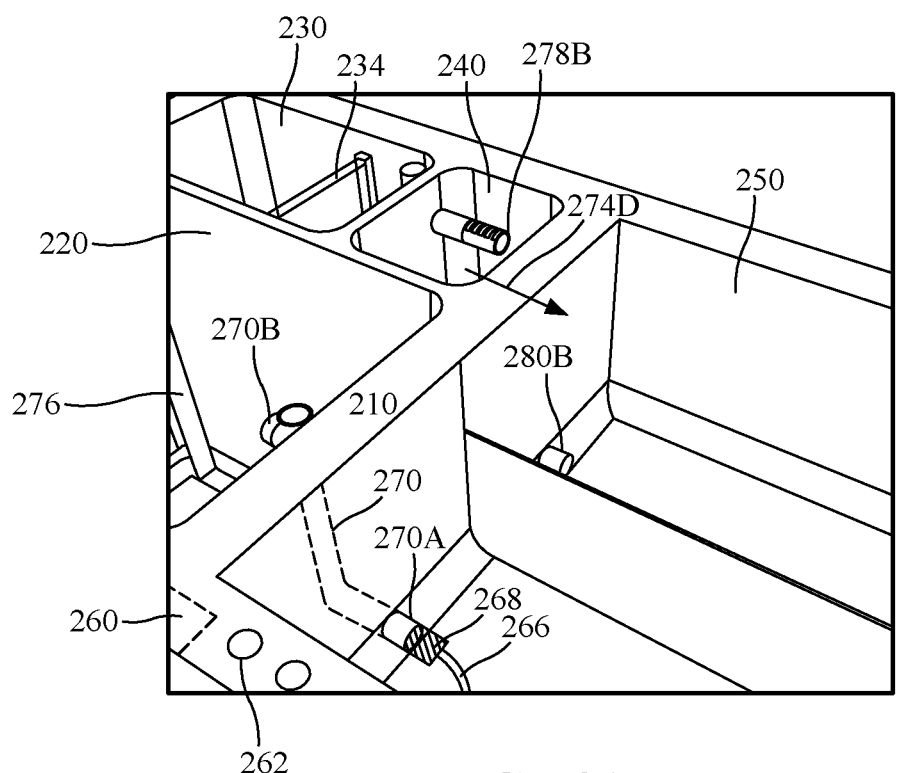
FIGS. 6A and 6B illustrate the piping connecting the various tanks of the MIAP aquaponics unit.
Figure 6B:
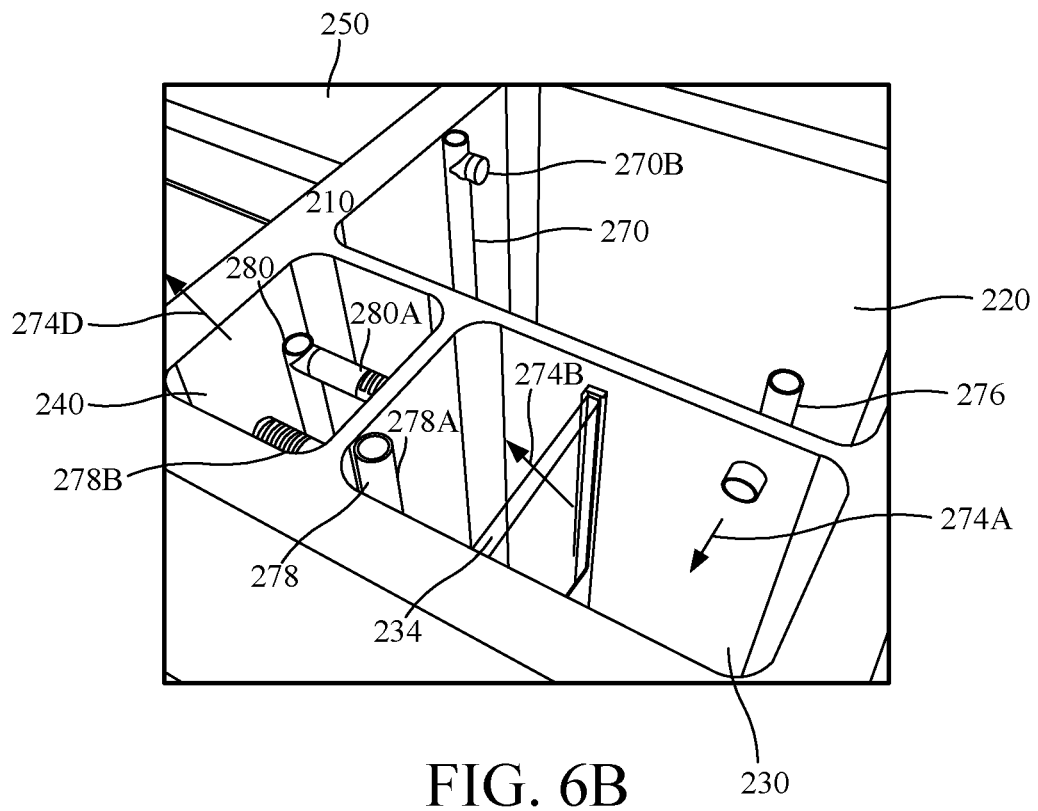

The aeration of the MIAP unit 200 and the various piping components are now discussed with regard to FIGS. 5, 6A and 6B. Each aquaponics unit's tank would function better if oxygen is added to the water to facilitate maximum plant and fish production and to prevent anaerobic conditions. Thus, each MIAP unit 200 includes an air pump 260. FIG. 3 shows a possible location of the air pump 260, i.e., inside chamber 263. Because the air pump 260 is not directly visible in FIG. 4, the contour of the air pump is indicated with a dash line. In one embodiment, a capacity of the air pump 260 is calculated to deliver 1.8 cubic feet air per minute (cfm) at 1.5 psi (35" water depth).

FIG. 5 shows the air pump 260 having an air input 262 and an air output 264. The air intake at the air input 262 is pushed out at the output 264 with higher pressure. A tube (e.g., vinyl tube) 266 connects the air output 264 to an air stone 268, from which air bubbles 272 combine with the water 274 and move upward a tubing 270. In this way, if the tank shown in FIG. 5 is connected to the hydroponics tank 250, the water may be raised from the hydroponics tank and pushed to the aquaculture tank 220.

FIGS. 6A and 6B show the piping components built into the framework 210, between the various tanks. More specifically, FIG. 6A shows the four tanks 220 to 250. Air pump 260 is partially illustrated in FIG. 6A, as the air pump is located inside chamber 263 (see FIG. 3). Tubing 266 is shown in FIG. 6A (also shown in FIG. 5) and brings the compressed air from the air pump 260 to air stone 268, which is located next to or inside a plant-to-fish tanks conduit 270. Plant-to-fish tanks conduit 270 is shown in FIG. 6A having an input 270A located at the bottom of the hydroponics tank 250 and an output 270B located at a top portion of the aquaculture tank 220. The plant-to-fish tanks conduit 270 may be made of polyvinyl chloride (PVC) piping, metal piping, high-density polyethylene (HDPE) or effectively may be a tunnel in the wall 212 of the framework 210. The output 270B of the plant-to-fish tanks conduit 270 is better seen in FIG. 6B. FIG. 6A also shows the air input 262 of the air pump 260. In this embodiment, the air input 262 is formed as a tunnel through the walls 212 of the framework 210. In another application, the air input 262 may be a pipe, e.g., PVC pipe. In still another embodiment, the air input 262 may be located on a side of the walls 212, outside the unit, or even inside chamber 263.

The air pump 260 may be connected to plural air stones (9 in one example) through vinyl tubing 266. In one embodiment, there will be two 3" air stones in the aquaculture tank, two 2" air stones in the bio-reactor, two 2" (or 3") air stones in the hydroponics tank and two 2" (or 3") air stones for the plant-to-fish tanks conduit 270. An air stone may be a porous stone, whose purpose is to gradually diffuse air into the tank. Other configurations of the air stones may be used.

The other connections between the various tanks are now discussed. FIGS. 6A and 6B show a solid lifting outflow (SLO) conduit 276 located in the aquaculture tank and is configured to bring water 274 from the bottom of the aquaculture tank 220 to a top of the clarifier tank 230 as indicated by path 274A. The conduit 276 may be made of PVC or equivalent materials or metal. The clarifier tank 230 feeds the water to the bio-reactor tank 240 through the cartridge filter 234, as indicated by arrow 274B. For the next step of the water flow, a clarifier-to-reactor tanks conduit 278 (e.g., PVC pipe) is located in the wall between the clarifier tank 230 and the bio-reactor 240, near the rim of the wall. FIG. 6B shows the input 278A of the clarifier-to-reactor tanks conduit 278 being present in the clarifier tank and the output 278B of the conduit 278 being present in the bio-reactor tank 240. In this way, the water will flow along arrow 274C between the two tanks.

A reactor-to-plant tanks conduit 280 is built into the framework 210, between the bio-reactor tank and the hydroponics tank, as illustrated in FIGS. 6A and 6B. The reactor-to-plant tanks conduit 280 has an input 280A in the bio-reactor tank 240 as shown in FIG. 6B, and an output 280B in the plant-tank 250, as illustrated in FIG. 6A. Thus, the water flows along arrow 274D, to the hydroponic channels, from the bio-reactor 240. The conduit 280 may be made from any material used for the other conduits or it simply may be formed as a tunnel into the wall of the framework.

The tanks and conduits discussed above may be formed in the framework 210. As discussed above with regard to FIG. 3, the framework has a single base 214 and plural walls 212. In one embodiment, the aquaculture tank 220 may be formed on a first portion 214A (see FIG. 4) of the single base 214 and a first set 212A of the plural walls 212, the clarifier tank 230 may be formed on a second portion 214B of the single base 214 and a second set 212B of the plural walls 212, the bio-reactor tank 240 may be formed on a third portion 214C of the single base 214 and a third set 212C of the plural walls 212, the hydroponics tank 250 may be formed on a fourth portion 214D of the single base 214 and a fourth set 212D of the plural walls 212 and the piping 270, 276, 278, 280 may be formed to extend through the plural walls 212, between each two adjacent tanks for allowing water from the aquaculture tank to flow into the clarifier tank and then into the bio-reactor tank and then into the hydroponics tank and back to the aquaculture tank.

Figure 7A:
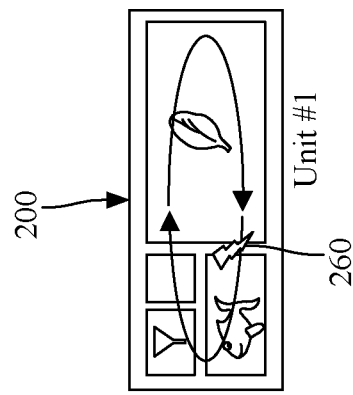
FIG. 7A shows a MIAP aquaponics unit in standalone mode and FIG. 7B shows plural MIAP aquaponics units connected in series.
Figure 7B:
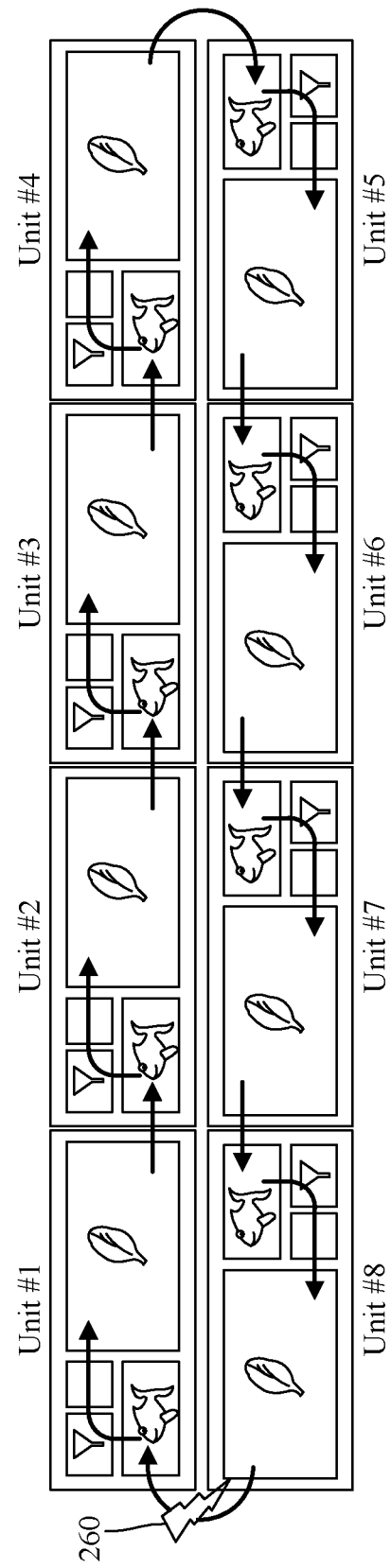

If operated in a stand-alone mode, each MIAP unit 200 will return the water from the hydroponics tank to the aquaculture tank via the conduit 270, which is also called an air lift pump. The air lift pump 270 is powered by the air pumped by the air pump 260 utilizing PVC piping. If operated in a series mode, the water from the MIAP unit 200 will continue to naturally flow from the hydroponic channels of current unit to the aquaculture tank of the next unit. FIG. 7A shows a single MIAP unit 200 having a single air pump and the unit being operated as a standalone unit and FIG. 7B shows 8 single MIAP units 200 connected in series and having a single air pump 260. The "leaves" in these figures indicate a hydroponics tank, and a "fish" indicates a aquaculture tank. To connect two units to each other, the hydroponics tank 250 may have, as illustrated in FIG. 8A, a first port 810 and the aquaculture tank may have a second port 820. To connect in series two units, the first port 810 from the first unit is fluidly connected to the second port 820 of the second unit. This connection may be achieved with a portion of hose that mechanically connects to the two ports. Otherwise, the ports are sealed with a corresponding cap.

The various conduits discussed above are also illustrated in more detail in FIGS. 8A to 9D. FIG. 8A shows the various tanks and conduits from a bird's perspective while FIG. 8B shows the same with some exemplary dimensions. FIG. 8B also shows an air distribution manifold 290, which may be placed in another chamber 291 (see FIG. 9D) or in the same chamber as the air pump 260. The air pumped by the air pump 260 is provided along tube 292 to the air manifold, and from here, the air may be distributed to the air stone 268 and also to other air stones, e.g., air stone 221 in the aquaculture tank 220, air stone 231 in the clarifier tank 230, air stone 241 in the bio-reactor tank 240, and air stone 251 in the hydroponics tank 250. As previously discussed, more than one air stone per tank may be used. For simplicity, FIG. 8B does not show all the pipe connections between the air manifold 290 and the air stones noted above.

Although FIGS. 8A and 8B show specific sizes for the various components of the MIAP unit 200, the present invention is not limited to the dimensions noted in these figures.

FIGS. 9A to 9D show the location of the conduits and associated exemplary sizes from a side view. FIG. 9D shows the location of the air manifold 290 relative to the air pump 260 and the locations of only two air stones 268 and 251. In one embodiment, the air input 262 of the air pump 260 is located at the top of the unit 200, as illustrated in FIG. 8B and FIG. 9D. Air manifold 290 may be made of plastic, brass, copper, aluminum or any other material that is suitable for wet conditions.

When operational, a MIAP unit 200 has water flowing from the bottom of the aquaculture tank through the SLO to the clarifier tank. The clarifier tank will feed the bio-reactor tank through the cartridge filter. The bio-reactor tank will feed the hydroponics tank. The hydroponic channels in the hydroponics tank are equipped with a drain pipe to pass the water back/to the aquaculture tank(s) with the help of the air lift pump.

In one embodiment, the recommended maximum total fish weight for each MIAP unit having the sizes noted in FIGS. 8A to 9D is 14 kg (corresponding o 32 kg fish/m$^3$ of water) when fed at 1.6% of body weight/day to achieve feed (g) to surface area (m$^2$) ratio of 80 g/m$^2$. The fish feed rate may be controlled through the incorporation of an automatic fish feeder 1000 at each aquaculture tank, as illustrated in FIG. 10.

In another embodiment, the selected Hydraulic Retention Time (HRT) for the aquaculture tank is 60 minutes at a water flow rate of 7.3 L/min, whereas the recommended HRT for the clarifier tank is about 20 minutes. The HRT is controlled by regulating the flow of air to the air lift pump. The air flow rate is set 1× manually and is left constant over the life of the system.

A total of 0.224 kg of fish feed will generate about 8.4 g total ammonia nitrogen daily, which will require a biofilter surface area of 16.8 m$^2$. The MIAP unit 200 will require 0.224 kg of oxygen addition daily for a target dissolved oxygen (DO) level in the water of 6 mg/L. The flow rate of oxygen into the system is regulated automatically by a properly-sized air pump, which is factory-installed and preset for each individual unit.

Figure 10:
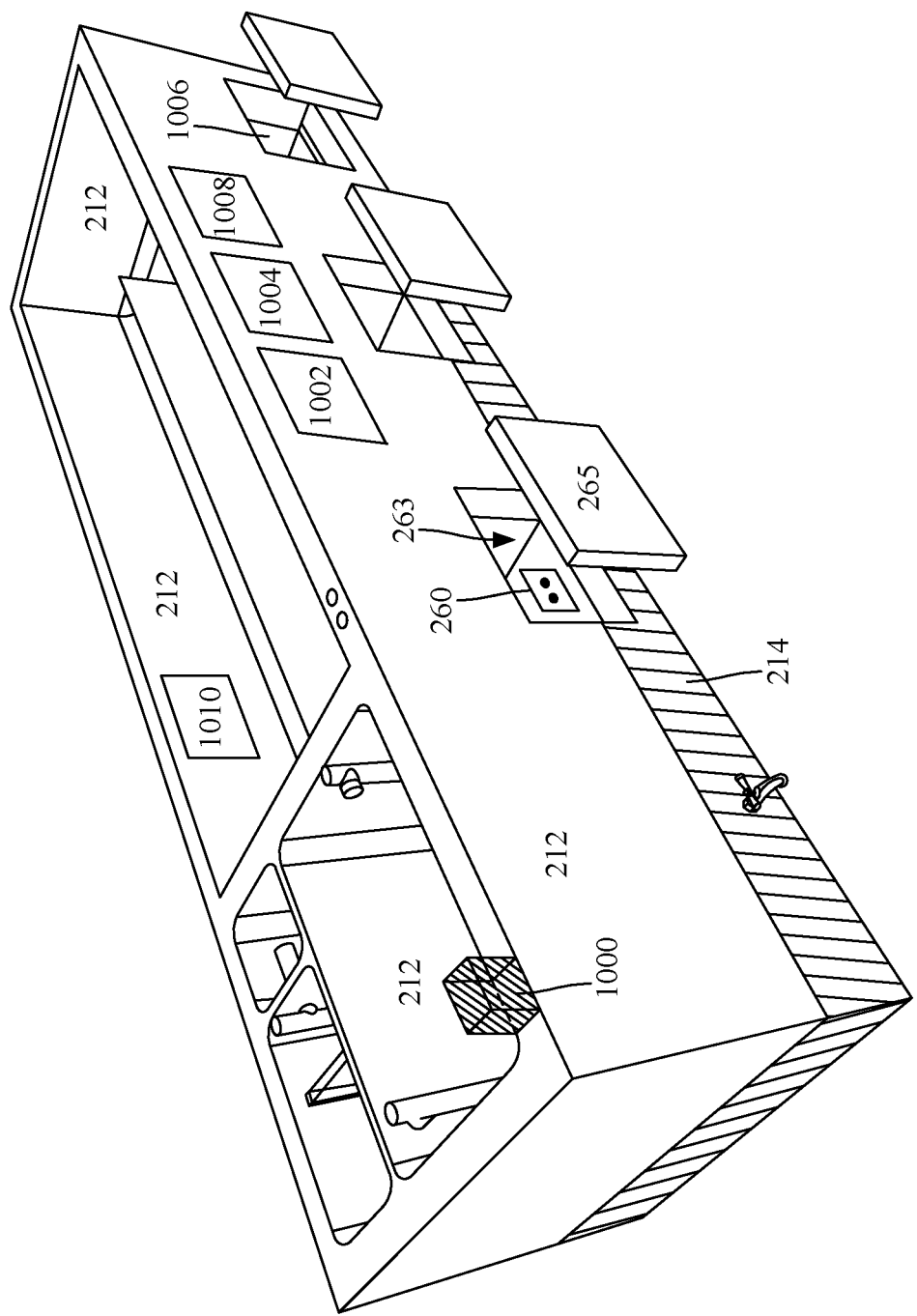
FIG. 10 shows a MIAP aquaponics unit with optional equipment.

Optionally, the MIAP unit 200 may include a solar thermal solar PV collection device 1002, that may be installed on an exterior wall of the framework as illustrated in FIG. 10. If enough solar devices 1002 are installed, the air pump may be operated independent of an external power supply. For cold climates, a heating system 1004 may be installed for heating the water. In one application, the heating system may be installed in a third chamber 1006 and various heating elements (e.g., resistors) may be installed in one or more of the tanks. In still another embodiment, for a hot climate, a cooling system 1008 (e.g., air conditioning unit) may be installed in the third chamber 1006. Each of the heating system and the cooling system may be provided with energy from an external power source. In yet another embodiment, an agriculture-grade lighting system 1010 may be installed next to the hydroponics tank, for growing the plants indoors or reducing the time to harvest.

Various materials may be used for the components of the MIAP unit. Some of the materials have already been discussed. In this paragraph, the materials to be used are summarized as follow. For the core it is possible to use molded and/or cut EPS foam block coated with polyurethane for water-tightness. For the piping/conduits, it is possible to use PVC. For the air tubes that connect the air pump to the air manifold and the air manifold to the various air stones it is possible to use vinyl. For the air stones, it is possible to use plastic and/or ceramic. For the air pump, it is possible to use plastic. For the cartridge filter it is possible to use matala mats. For the bio-reactor it is possible to use plastic and/or ceramic media.

Figure 11:
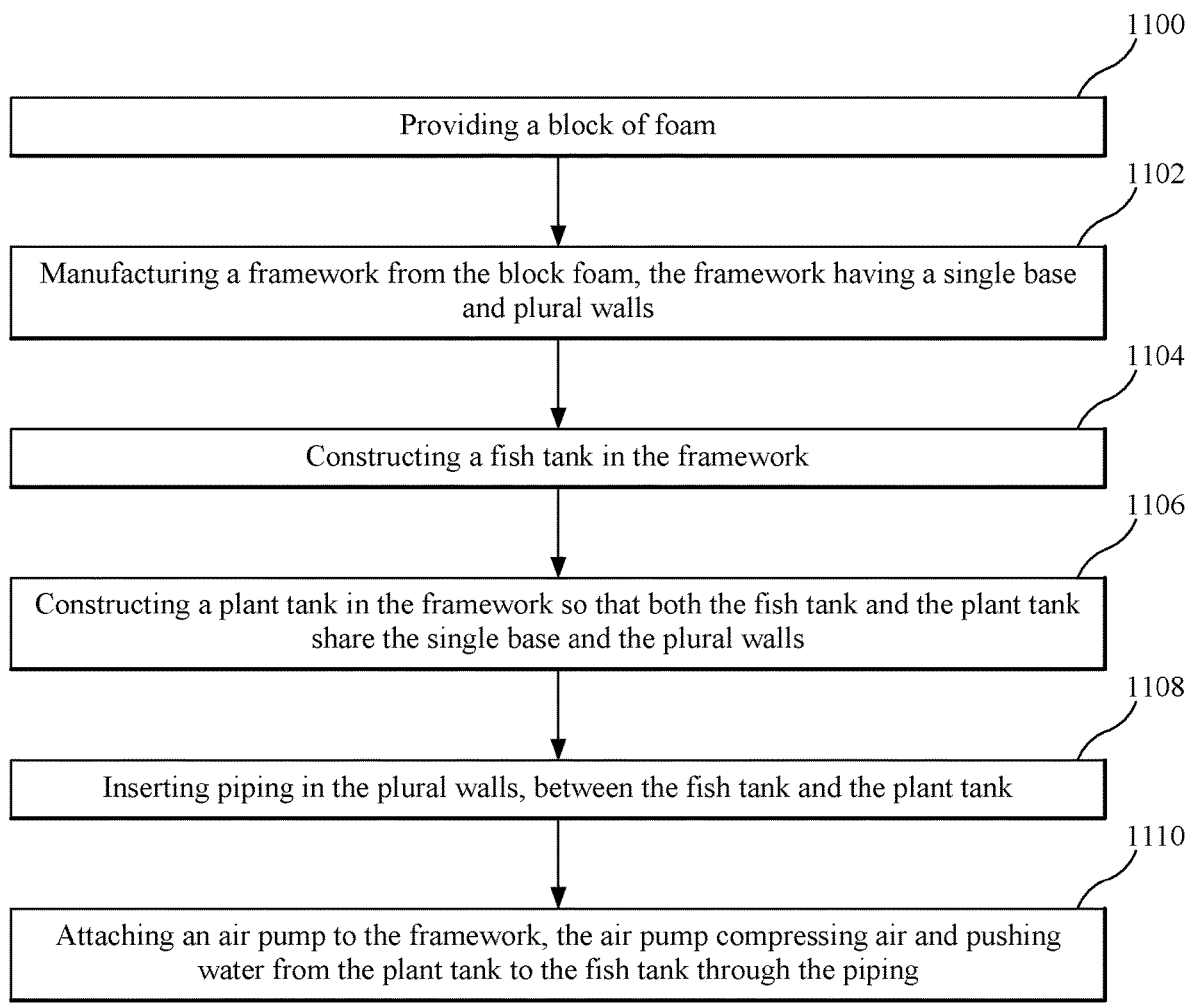
FIG. 11 is a flowchart of a method for manufacturing a MIAP aquaponics unit.

A method of manufacturing a modular, insulated, all-in-one, plug-and-play aquaponics unit 200 is now discussed with regard to FIG. 11. The method includes a step 1100 of providing a block of foam, a step 1102 of manufacturing a framework from the block of foam, the framework having a single base and plural walls, a step 1104 of constructing a aquaculture tank in the framework, a step 1106 of constructing a hydroponics tank in the framework so that both the aquaculture tank and the hydroponics tank share the single base and the plural walls, a step 1108 of inserting piping in the plural walls, between the aquaculture tank and the hydroponics tank, and a step 1110 of attaching an air pump to the framework, the air pump compressing air and pushing water from the hydroponics tank to the aquaculture tank through the piping.

Figure 12A:
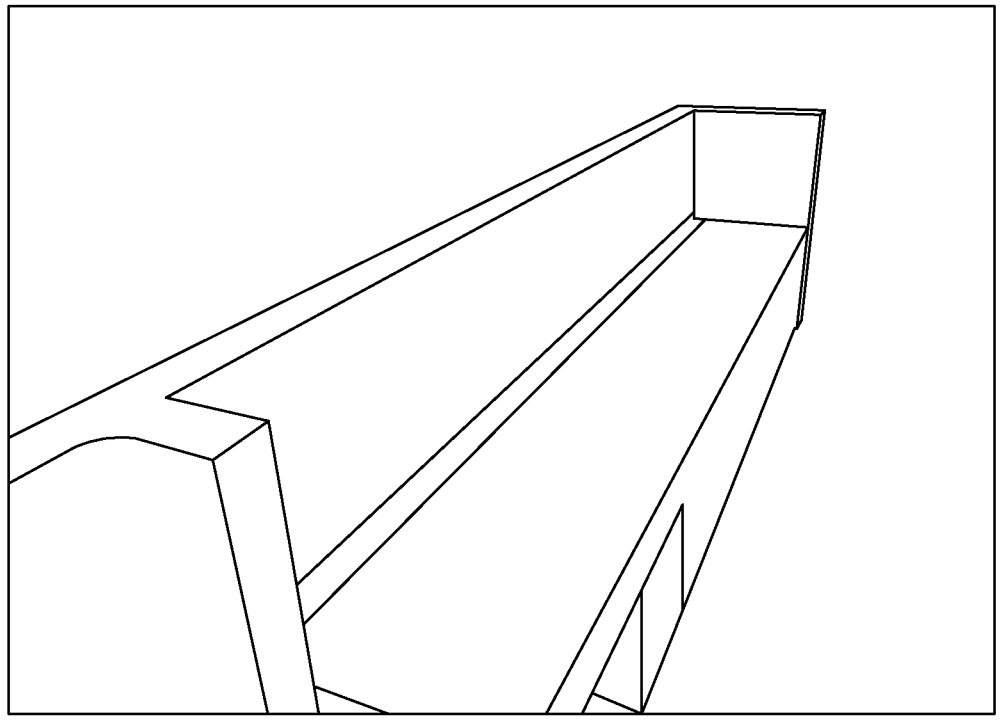
FIGS. 12A and 12B show two parts of the MIAP unit being made from foam blocks.
Figure 12B:
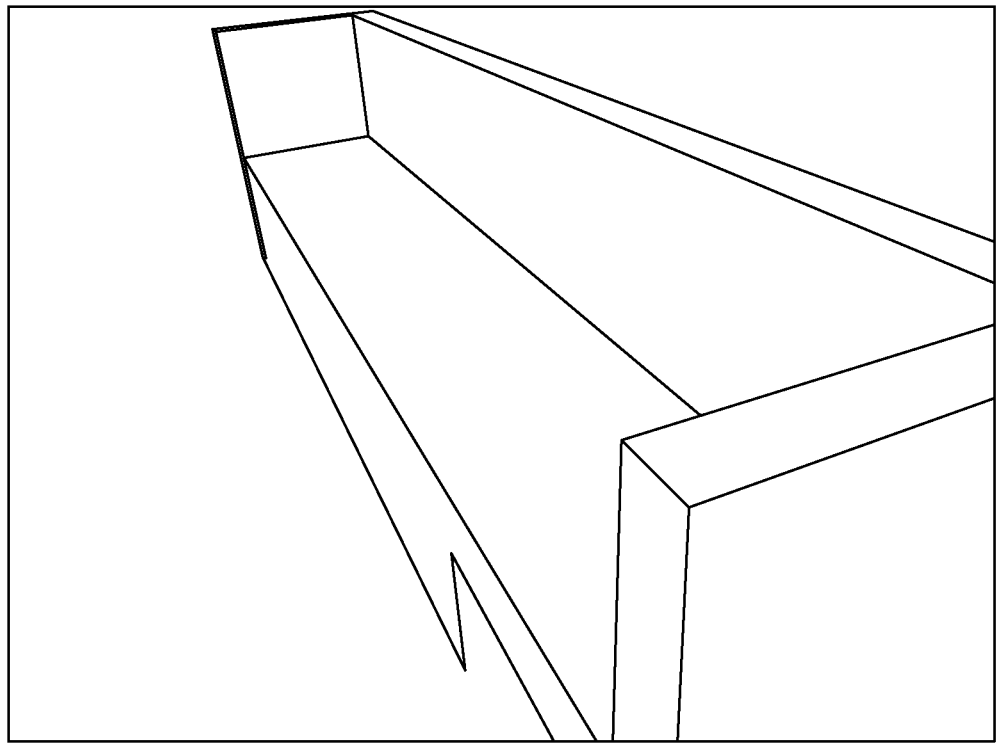
Figure 12C:
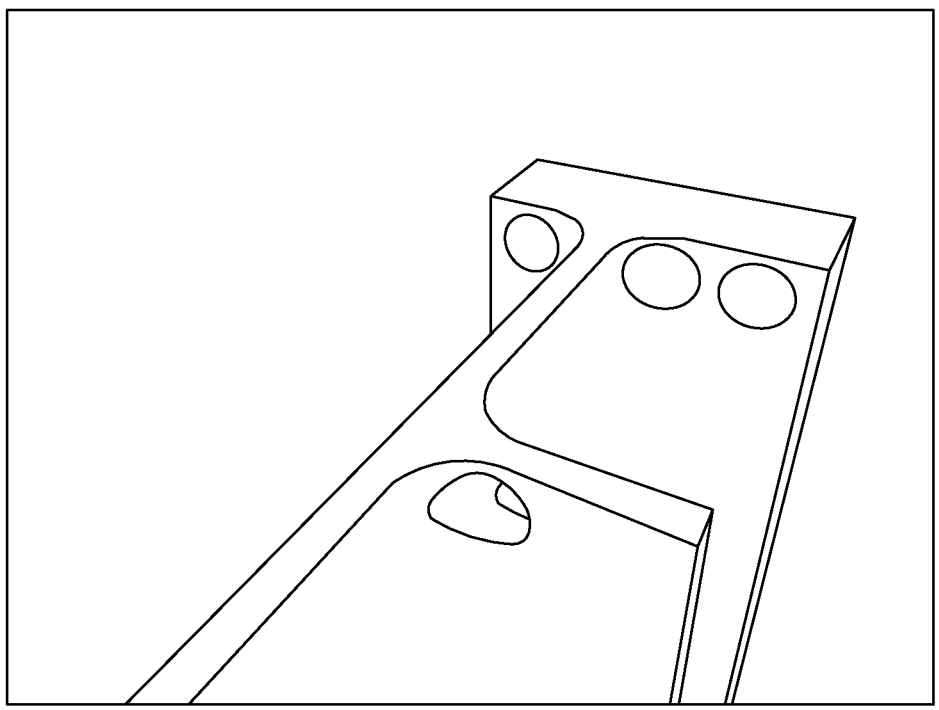
FIG. 12C shows the holes made in the wall for accommodating the piping.
Figure 12D:
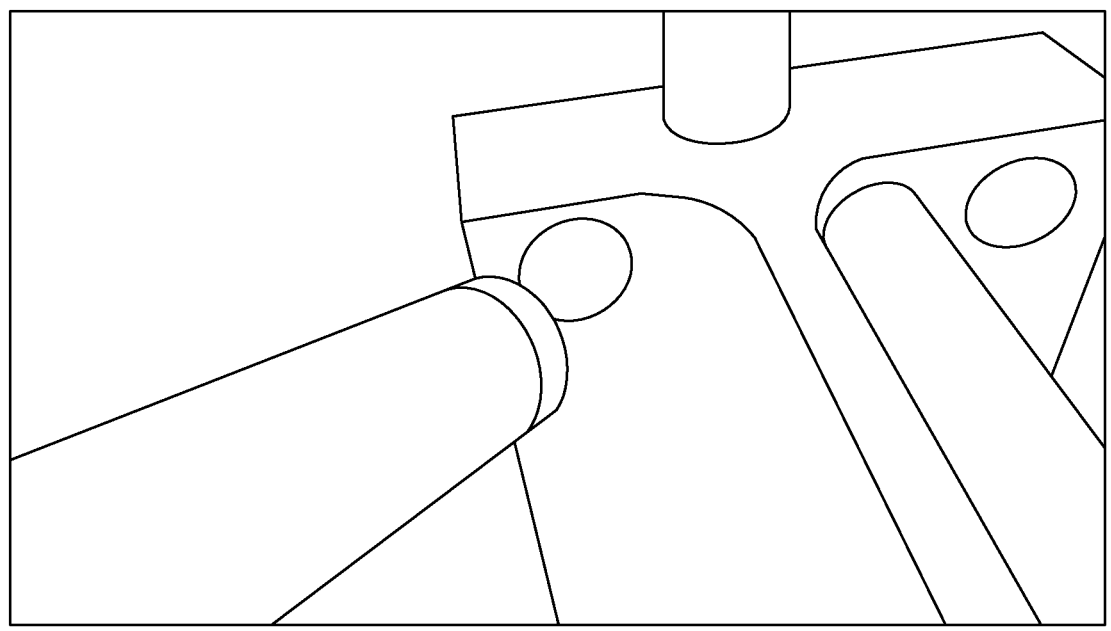
FIG. 12D shows the piping being attached to the walls and being sealed.
Figure 12E:
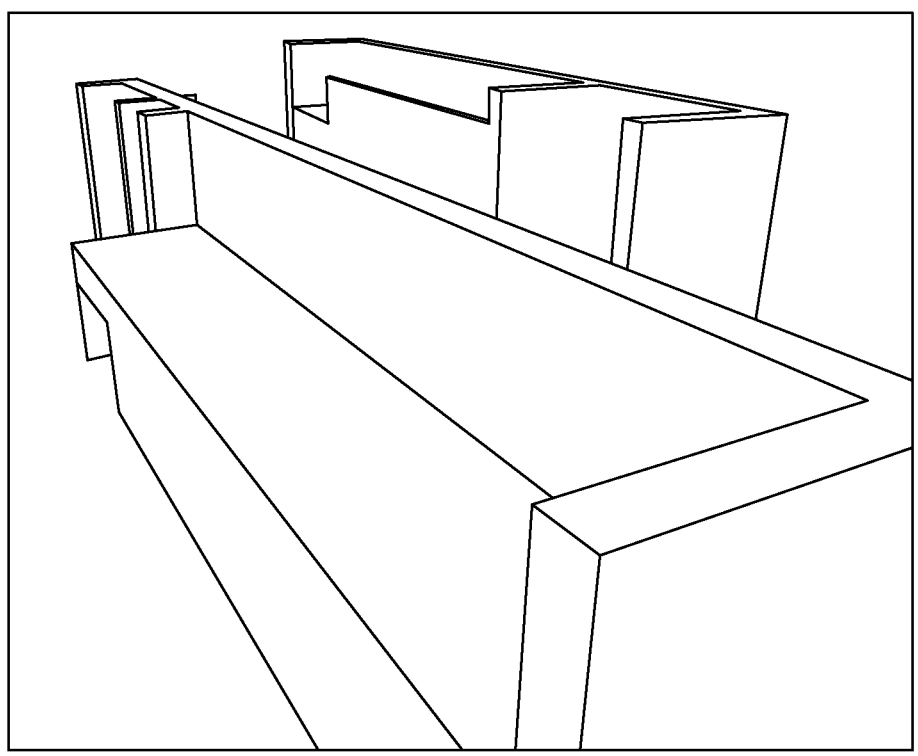
FIG. 12E shows the parts of the MIAP unit being coated with a protective sealant.
Figure 12F:
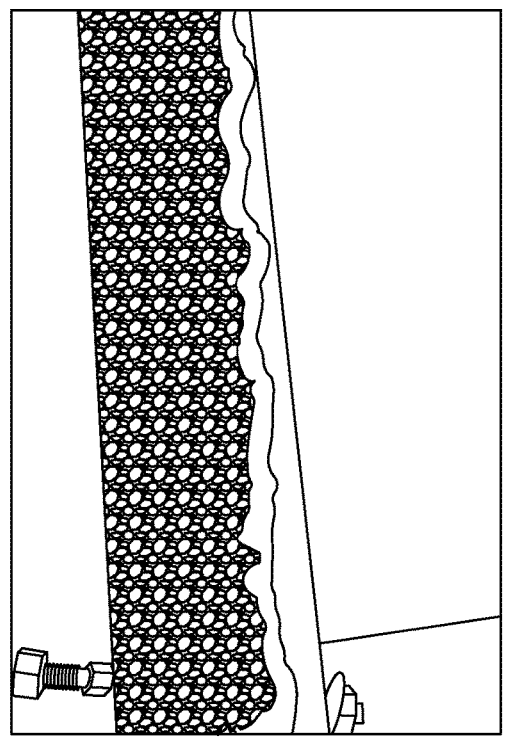
FIG. 12F shows a glue/sealant being distributed over parts of the MIAP unit.
Figure 12G:
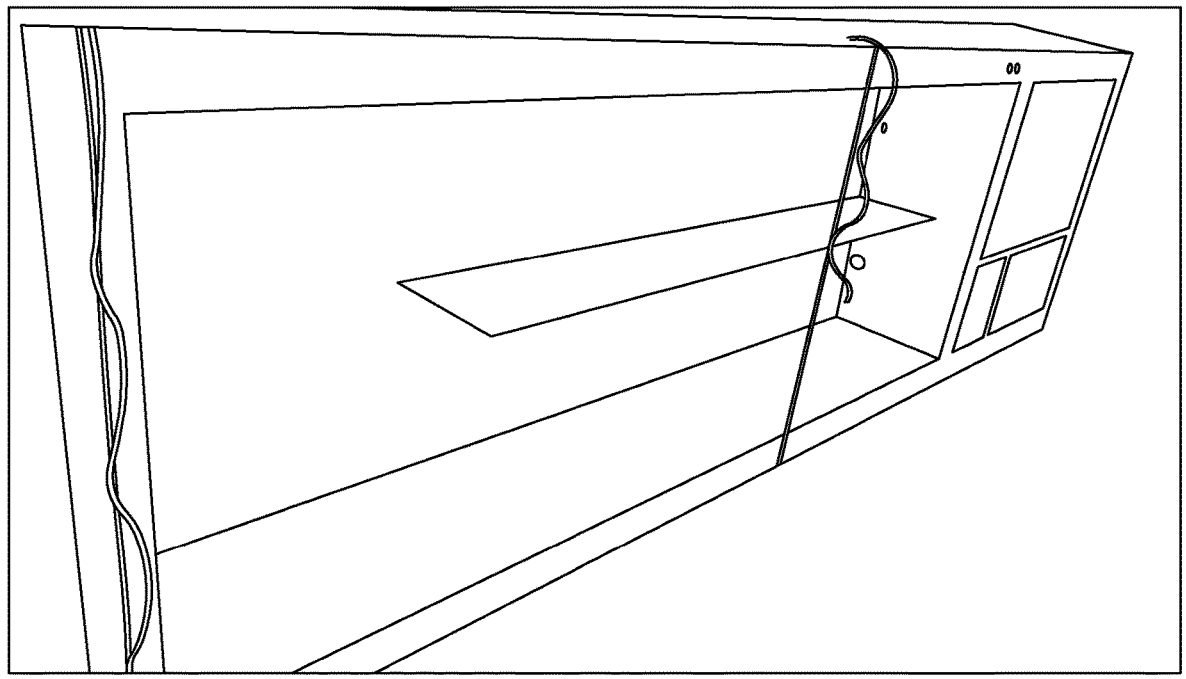
FIG. 12G shows the two parts of the MIAP unit being attached to each other.

Another method for manufacturing the MIAP unit is now discussed. FIG. 12A shows a first part (about a half) of the MIAP unit being made from a single block of foam. The first part includes half of the aquaponics tank, the clarifier tank and the bio-reactor tank. A second part of the MIAP unit is built from another foam block, as illustrated in FIG. 12B. Holes are then made in the various walls of the unit for accommodating the conduits discussed above, as illustrated in FIG. 12C. The conduits and other piping are added to the MIAP unit as illustrated in FIG. 12D and a sealant is used to seal the spaces between the piping and the walls of the unit. Next, a polyurea coating may be sprayed on the interior walls and bottom of the MIAP unit as illustrated in FIG. 12E. After this operation, the first and second parts are attached to each other, for example, using a glue and/or sealant material as illustrated in FIG. 12F. The final MIAP unit, after being glued together, is illustrated in FIG. 12G. Testing is then performed to ensure that there is no water leaking from the unit.

The MIAP unit discussed herein has at least one of the following characteristics: it is an all-in-one aquaponics system with built-in internal rather than assembly-required external plumbing connections, multiple MIAP aquaponics units can be easily connected in series for truly modular scale-up in production, and because the core material of construction is foam, the MIAP units have built-in insulation for higher production and energy conservation.

The disclosed embodiments provide methods and systems for growing plants and fish in a single unitary unit that can be used as is, directly from the packing material. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A modular, insulated, all-in-one, plug-and-play (MIAP) aquaponics unit comprising:
   a unitary framework having a single base and plural walls;
   a first portion of the single base and a first set of the plural walls define an aquaculture tank;
   a second portion of the single base and a second set of the plural walls define a clarifier tank;
   a third portion of the single base and a third set of the plural walls define a bio-reactor tank;
   a fourth portion of the single base and a fourth set of the plural walls define a hydroponics tank; and
   piping extending through the plural walls between each two adjacent tanks for allowing water from the aquaculture tank to flow into the clarifier tank and then into the bio-reactor tank and then into the hydroponics tank and back to the aquaculture tank,
   wherein each wall of the aquaculture tank, the clarifier tank, the bio-reactor tank, and the hydroponics tank is fixedly attached to the single base to achieve the unitary framework,
   wherein the aquaculture tank, the clarifier tank, and the bio-reactor tank are located together on, and completely covering, a first region of the single base, and the hydroponic tank is located on, and completely covers, a second region of the single base, adjacent to the first region, and
   wherein the first region has the same width as the second region, but a smaller length than the second region, and the hydroponic tank has a smaller depth than the aquaculture tank.

2. The MIAP aquaponics unit of claim 1, further comprising:
   an air pump that supplies compressed air to a plant-to-fish tanks conduit, which is part of the piping, for pushing the water from the hydroponics tank to the aquaculture tank in the form of an air lift pump,
   wherein a depth of the hydroponics tank is smaller than a depth of the aquaculture tank.

3. The MIAP aquaponics unit of claim 2, wherein the piping comprises:
   the plant-to-fish tanks conduit for transferring the water from the hydroponics tank to the aquaculture tank.

4. The MIAP aquaponics unit of claim 3, wherein the piping further comprises:
   a solid lifting outflow conduit that is configured to bring the water, sludge, and small, water-suspended solids from a bottom of the aquaculture tank to a top of the clarifier tank.

5. The MIAP aquaponics unit of claim 4, wherein the piping further comprises:
   a clarifier-to-reactor tanks conduit located in a wall between the clarifier tank and the bio-reactor tank and configured to transfer the water from the clarifier tank to the bio-reactor tank.

6. The MIAP aquaponics unit of claim 5, wherein the piping further comprises:

a reactor-to-plant tanks conduit built in a wall between the bio-reactor tank and the hydroponics tank and configured to transfer the water from the bio-reactor tank to the hydroponics tank.

7. The MIAP aquaponics unit of claim 2, wherein the air pump is located in a chamber formed within the framework.

8. The MIAP aquaponics unit of claim 2, wherein an air input for the air pump is formed in a wall of the plural walls of the framework.

9. The MIAP aquaponics unit of claim 1, further comprising:
a cartridge filter located in the clarifier tank and configured to remove solid waste from the water coming from the aquaculture tank.

10. The MIAP aquaponics unit of claim 2, further comprising:
an air manifold connected to the air pump, the air manifold being directly connected to the plant-to-fish tanks conduit for providing the compressed air for pushing the water from the hydroponics tank to the aquaculture tank against gravity.

11. The MIAP aquaponics unit of claim 10, further comprising:
an air stone located in the hydroponics tank, next to an input of the plant-to-fish tanks conduit; and
a tube connecting the air manifold to the air stone.

12. The MIAP aquaponics unit of claim 11, further comprising:
at least one air stone located in each tank except the clarifier, which has no air stone; and
a corresponding pipe/tubing for each air stone that connects the air manifold to each air stone.

13. The MIAP aquaponics unit of claim 10, wherein the air pump and the air manifold are located in a chamber formed within the framework.

14. The MIAP aquaponics unit of claim 10, wherein the air pump is located in a first chamber formed within the framework and the air manifold is located in a second chamber formed within the framework.

15. The MIAP aquaponics unit of claim 1, wherein the framework is made out of foam and the piping is made out of polyvinyl chloride.

* * * * *